United States Patent [19]

Bell

[11] Patent Number: 4,649,332
[45] Date of Patent: Mar. 10, 1987

[54] TROLLING MOTOR BATTERY CONNECTOR SYSTEM

[76] Inventor: Stuart D. Bell, R.R. 2, Camp Point, Ill. 62320

[21] Appl. No.: 769,406

[22] Filed: Aug. 26, 1985

[51] Int. Cl.⁴ .................. H02J 7/00; H01M 10/46; H01R 13/62
[52] U.S. Cl. .................................. 320/7; 320/16; 339/18 P; 339/46; 339/75 A
[58] Field of Search ........................ 320/2–7, 320/15, 16; 339/18 P, 46, 75 A, 258 RR

[56] References Cited

U.S. PATENT DOCUMENTS

| | | | |
|---|---|---|---|
| 1,336,801 | 4/1920 | Wassell | 339/18 P |
| 1,924,959 | 8/1933 | Patterson, Jr. | 320/7 |
| 2,209,185 | 7/1940 | Bower et al. | 339/18 P |
| 2,649,493 | 8/1953 | Temple | 320/7 UX |
| 2,792,559 | 5/1957 | Maberry | 339/18 P |
| 2,940,739 | 9/1959 | Reed, Jr. | 320/7 |
| 4,081,738 | 3/1978 | Roller | 320/7 |
| 4,114,082 | 9/1978 | Scheidler | 320/7 |
| 4,192,572 | 3/1980 | Stanger | 339/46 X |

Primary Examiner—R. J. Hickey
Attorney, Agent, or Firm—Litman, Day & McMahon

[57] ABSTRACT

A low resistance connector system for a trolling motor battery includes a receptacle having sockets connected to the terminals of two rechargeable batteries, a charger plug, and a trolling motor power plug. The two plugs are similar and each includes pins for engagement with the sockets of the receptacle. The charger plug has a pair of charger jumpers which interconnect the charger pins in such a manner that insertion of the charger plug into the receptacle connects the two batteries in parallel for charging by a battery charger connected to the charger plug. The power plug has a power jumper interconnecting two of its power pins such that when the power plug is inserted into the receptacle, the batteries are connected in series and provide the voltage from one of the batteries and, additionally, the combined voltages of both batteries for powering the trolling motor. The plugs and receptacle are cooperatively keyed to properly orient the plug pins in the sockets of the receptacle.

7 Claims, 11 Drawing Figures

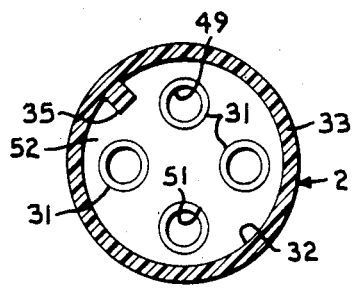
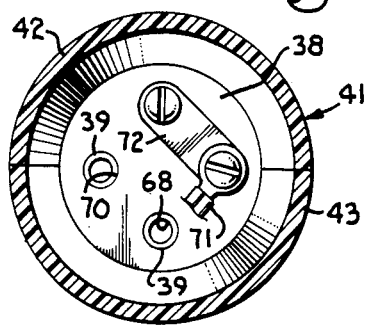
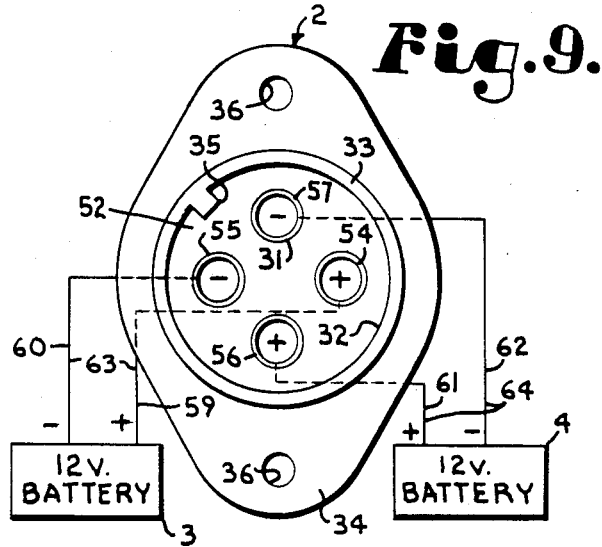
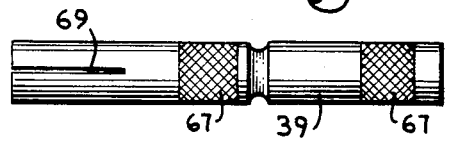
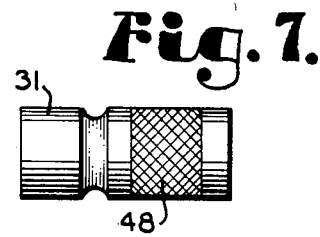
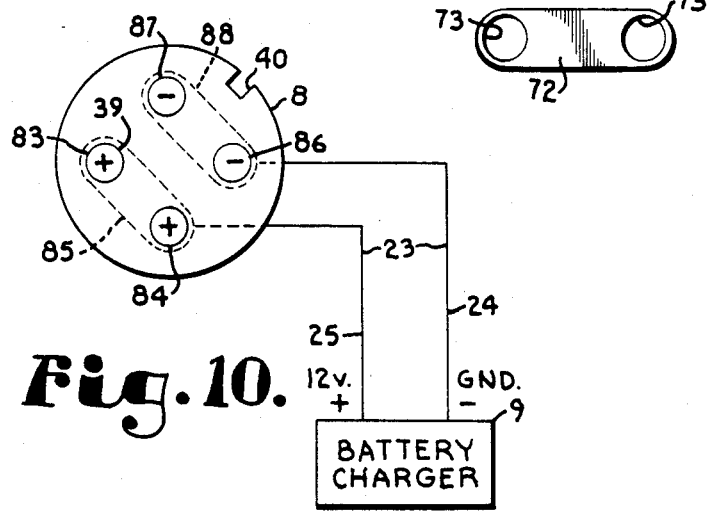
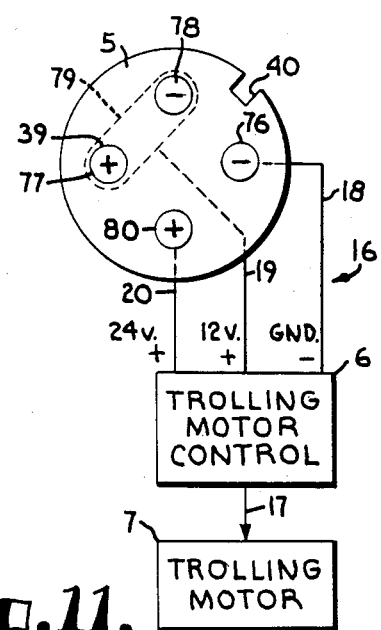

TROLLING MOTOR BATTERY CONNECTOR SYSTEM

FIELD OF THE INVENTION

The present invention relates to apparatus for interconnecting rechargeable batteries differently for recharging and for use and, more particularly, to a plug and receptacle set for such different interconnections.

BACKGROUND OF THE INVENTION

Electrical trolling motors are often used on fishing boats such as bass boats for quiet, low speed propulsion in fishing areas such as coves and inlets of lakes where the more powerful and noisier gasoline motor would tend to scare the fish away. The trolling motors are commonly powered by rechargeable batteries similar to automobile batteries. Often, two 12 volt batteries connected in series are employed to provide low speed power using one battery and a higher speed with the two batteries providing 24 volts. While it is desirable to connect the batteries in series for operation of the trolling motor, it is desirable to charge the batteries separately or to connect the batteries in parallel for recharging, for two reasons. First, when series connected batteries are charged, usually either the weaker battery is undercharged or the stronger battery is overcharged. Second, 12 volt battery charging devices are commonly available for recharging automobile batteries while 24 volt chargers are not as common and are, therefore, more expensive.

It is generally not desirable to manually disconnect the trolling motor or trolling motor control from the battery terminals, to connect the charger to each battery separately or to the parallel combination, and then reconnect the batteries in series to the motor. Such operations are laborious and unsafe if a wiring mistake is made which could result in damage to the batteries and the charger or injury to the boater or fisherman.

To prevent such problems, switching arrangements have been developed which connect the batteries in series for motor use and in parallel for charging. The known switching arrangements have employed manually operated switches, relays, and solid state switching components to accomplish the switching functions. While such switching arrangements have generally been successful in facilitating the proper interconnection of batteries for motor use and recharging, they are also relatively expensive. Since the environments which boats with such motors are exposed to run the entire range of cold, hot, wet and dry, the switching components must be carefully sealed to prevent corrosion of the switch and relay contacts and ensuing malfunction thereof. This adds to the expense of such arrangements.

Since trolling motors are typically operated at low voltages provided by batteries, the current drawn by them for a given power output is high. In addition, trolling motors have been found to be "voltage sensitive" in that small increases in series resistance between the batteries and the motor results in noticeable decreases in performance. For these reasons, the wiring for such motors is required to be of a heavy gage to handle the high current and to avoid adding resistance. The gage of the wiring is not a problem in itself. However, a problem of expense occurs in obtaining power connectors to handle the high current and heavy gages of wire needed. Commonly available and, thus, relatively inexpensive connectors are usually only rated for 20 Amperes maximum current. Such plugs and receptacles are usually designed for single connections of No. 8 to No. 10 AWG (American Wire Gage) sized conductors with no convenient provision for interconnections among the contact portions of the connectors. In battery operated trolling motors, it is desirable to provide a rated 45 Ampere capacity and employ No. 2 or No. 6 AWG sized conductors to lower the series resistance. However, there is a considerable cost leap to such higher rated connectors since such connectors are seldom used in consumer oriented products.

SUMMARY OF THE INVENTION

The present invention is an improvement over the heretofore employed trolling motor battery interconnection arrangements. The present invention provides a receptacle having pin sockets to which the terminals of two batteries are connected. A trolling motor power plug has pins which are received in the receptacle sockets and which are interconnected by a power jumper link to connect the batteries in series upon insertion of the power plug into the receptacle. A three conductor power cable connects with the pins and provides a ground, 12 volts, and 24 volts for connection to the trolling motor or a controller therefor. A separate charger plug is similar to the power plug except that the charger pins are interconnected by a pair of charger jumper links such that when the charger plug is inserted into the receptacle, the batteries are connected in parallel for charging. A two conductor charger cable is connected between the charger pins and a battery charger.

The receptacle, power plug and charger plug are all similarly keyed to prevent insertion of plugs into the receptacle in an improper orientation. Once the receptacle sockets are properly connected to the batteries, the power plug to the trolling motor and the charger plug to the charger, it is only necessary to insert the power plug to operate the motor or the charger plug to charge the batteries. Since the interconnections reside in the plugs, the batteries are connected properly upon the insertion of respective plug.

Connections are made to the plugs and receptacle by screw lugs which are sized for use with No. 2 AWG conductors. The jumper links on the plugs are elongated strips of copper with apertures through the ends to pass the screws which attach the screw lugs to the plug pins. Each of the plugs includes a strain relief clamp which is sized to accommodate a three conductor cable in which each of the conductors is No. 2 AWG conductor. By these means, a low resistance path is conveniently provided between the batteries and the trolling motor or between the battery charger and the batteries.

OBJECTS OF THE INVENTION

The principal objects of the present invention are: to provide an improved apparatus for interconnecting rechargeable batteries in series for powering, particularly, a trolling motor and in parallel for recharging the batteries; to provide such an apparatus which is rugged and not subject to deterioration of performance in the environments in which trolling motors are used or stored; to provide such an apparatus which does not involve switch or relay contacts or solid state components; to provide such an apparatus which requires only minimal skill to properly interconnect such batteries; to provide such an apparatus which once properly installed makes it virtually impossible to improperly interconnect the batteries; to provide such an apparatus including a receptacle having sockets which are connected to the terminals of the batteries, a power plug and a charger plug wherein the batteries are properly interconnected upon the insertion of the respective plug into the receptacle; to provide such an apparatus which is easily retrofitted to most existing trolling motors and chargers for the batteries thereof; to provide such an apparatus which more efficiently utilizes the energy stored in the batteries by decreasing the losses attributable to series resistance between the batteries and the trolling motor; and to provide such an apparatus which is economical to manufacture, safe and durable in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a transverse sectional view taken on line 4—4 of FIG. 3 and illustrates details of the receptacle and the sockets therein.

FIG. 5 is a transverse sectional view taken on line 5—5 of FIG. 3 and illustrates a jumper interconnecting selected pins of a plug of the battery connector system.

FIG. 6 is a further enlarged side elevational view of one of the plug pins of the battery connector system.

FIG. 7 is a side elevational view of one of the receptacle sockets shown at the same scale as FIG. 6.

FIG. 8 is a side elevational view of one of the jumper members used to interconnect the pins of the plugs, shown at the same scale as FIG. 6.

FIG. 9 is a front end elevational view at a somewhat reduced scale of the receptacle of the connector system with a pair of batteries connected to the sockets of the receptacle shown schematically.

FIG. 10 is a schematic front end elevational view of the charger plug of the connector system with the pins thereof interconnected by jumpers and a battery charger shown connected to the pairs of pins.

FIG. 11 is a view similar to FIG. 10 and shows the power plug of the connector system with selected pins thereof interconnected by a jumper and a trolling motor controller shown connected to the pins of the power plug.

DETAILED DESCRIPTION OF THE PREFERRED EMBODIMENT

Figure 1:
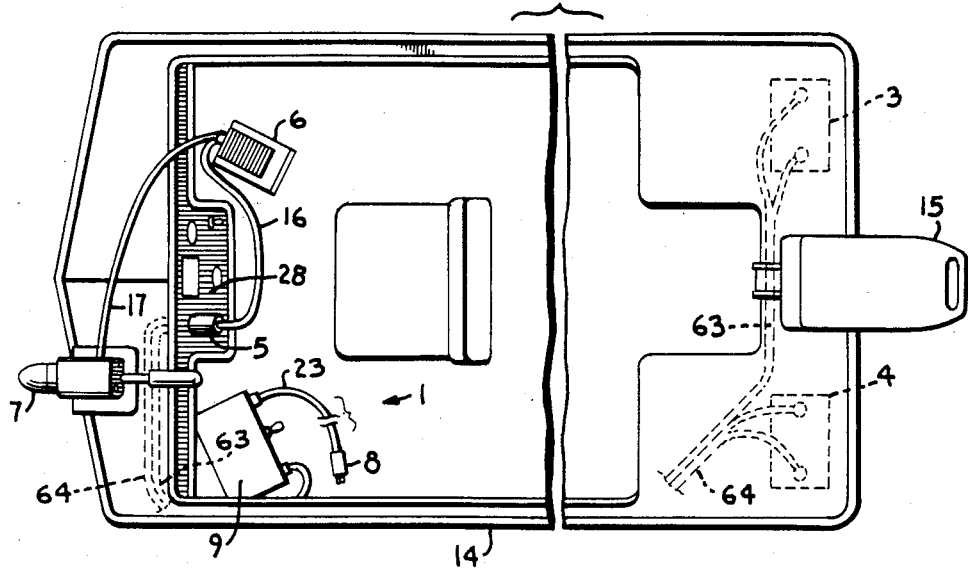
FIG. 1 is a fragmentary plan view of a boat and trolling motor on which the battery connector system according to the present invention is installed.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a trolling motor battery connector system according to the present invention. The connector system 1 generally includes a receptacle 2 connected to a pair of batteries 3 and 4, a power plug 5 connected to a controller 6 of a trolling motor 7, and a charger plug 8 connected to a battery charger 9. When the power plug 5 is inserted into the receptacle 2, the batteries 3 and 4 are connected in series and provide a single battery voltage and a double battery voltage for operating the motor 7. When the charger plug 8 is inserted into the receptacle 2, the batteries 3 and 4 are connected in parallel for recharging same.

The trolling motor 7 is used for secondary propulsion of a boat 14 such as a bass boat which is normally powered by an outboard gasoline fueled motor 15. The foot operated trolling motor controller 6 is used to control the speed of the motor 7. The controller 6 is conventional and has a power cable 16 connected between it and the power plug 5 and a motor cable 17 connected between the controller 6 and the trolling motor 7. The power cable 16 has at least three conductors: a battery negative or ground conductor 18, a single battery positive or twelve volt conductor 19 and a double battery positive or twenty-four volt conductor 20 (see FIG. 11).

The charger 9 is a conventional twelve volt battery charger as are commercially available for recharging automobile type batteries. The charger 9 receives electrical power from an ordinary alternating current power line (not shown) and converts the alternating current to direct current at twelve volts. Such chargers often incorporate means for sensing the state of the battery being charged and control the flow of current thereto to avoid overheating or overcharging the battery. A two conductor charger cable 23 connects the charger plug 8 to the charger 9 and includes a charger negative or ground conductor 24 and a charger positive conductor 25 (see FIG. 10).

Figure 3:
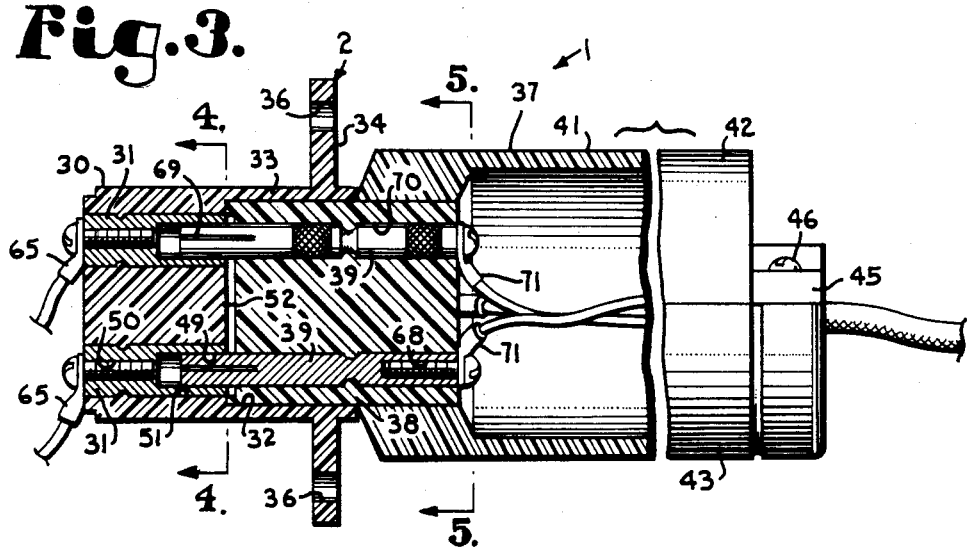
FIG. 3 is an enlarged longitudinal sectional view of one of the plugs inserted in the receptacle of the battery connector system.

The receptacle 2 is preferably positioned in a control panel 28 mounted at a convenient location on the boat 14. The panel 28 may also include switches, fuses and a panel meter to monitor the condition of the batteries 3 and 4. Referring to FIG. 3, the illustrated receptacle 2 includes a cylindrical socket mounting body 30 having two pairs of sockets 31 positioned therein. The body 30 includes a plug receiving recess 32 at an outer end which forms a receptacle cylindrical wall 33. A panel mounting plate 34 having mounting holes 36 therein surrounds the body 30 and provides for securing the receptacle 2 on the panel 28. In a preferred form of the receptacle 2, a key ridge 35 is formed within the recess 32 on the wall 33 to properly orient the plugs 5 and 8 in the receptacle.

Figure 2:
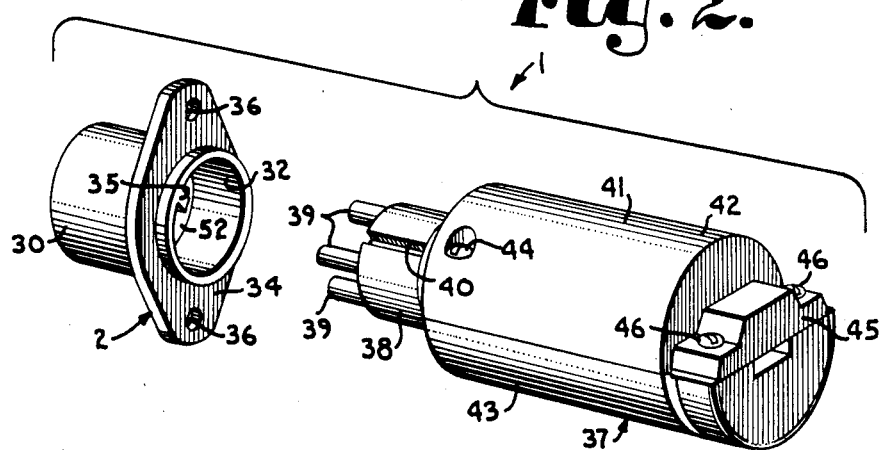
FIG. 2 is an exploded perspective view of a receptacle and plug system embodying the battery connector system.

The power plug 5 and charger plug 8 are similar in most respects and each comprises a general plug assembly 37 (FIG. 2). Each plug assembly 37 includes a cylindrical pin mounting body 38 sized and shaped to be received in the receptacle recess 32. Two pairs of plug pins 39 are positioned in the body 38 in a pattern to cooperate with the sockets 31 of the receptacle 2. A key slot 40 is formed in the cylindrical outer surface of the body 38 for cooperation with the key ridge 35 of the receptacle 2 to properly orient the plug assembly 37 within the recess 32. The pin mounting body 38 is supported by a plug assembly enclosure 41 including enclosure halves 42 and 43 which are fastened together as by screws 44 to clampingly engage the pin mounting body 38. The enclosure 41 prevents contact with the inner ends of the pins 39 and the conductors connected thereto. In addition, the enclosure 41 includes a cable strain relief clamp 45 which is fastened to one of the enclosure halves (for example, half 43) as by screws 46 for securing one of the cables 16 or 23 thereto.

The socket mounting body 30 and mounting plate 34 of the receptacle and the portions of the plug assemblies 37 except for the pins 39 are preferably formed as by molding from a hard, durable, nonconductive thermoplastic such as that sold under the name of Delrin (trademark of Du Pont and Co.).

Each of the illustrated socket members 31 is cylindrical in shape and includes a pin receiving bore 49 at one end and a threaded screw receiving bore 50 at the other end. The socket members 31 preferably include a knurled band 48 on an outer surface for enhanced gripping by the socket mounting body 30. For installation, the sockets 31 may be heated and then pressed into socket receiving apertures 51 formed in the socket mounting body 30 of the receptacle 2 until the pin receiving bore ends are about flush with an end surface 52 of the recess 32. The illustrated sockets 31 are positioned in a cross or circular pattern and are designated as a first positive socket 54, a first negative or ground socket 55, a second positive socket 56 and a second negative or ground socket 57. The first positive and negative sockets 54 and 55 are connected respectively to the positive terminal 59 and negative terminal 60 of the first battery 3. Similarly, the second positive and negative sockets 56 and 57 are connected respectively to the positive terminal 61 and negative terminal 62 of the second battery 4. The batteries 3 and 4 are connected to the sockets 31 by respective battery cables 63 and 64 having conventional battery terminal connectors (not shown) at the battery ends and screw lugs 65 at the socket ends.

The plug pins 39 are somewhat similar to the sockets 31 except longer and of smaller diameter to have the outer ends received in the bores 49 of the sockets. The pins 39 have threaded screw receiving bores 68 formed in their inner ends and slits 69 in their outer ends. The pins 39 include knurled bands 67 on their outer surfaces and may be heated before being pressed into pin receiving apertures 70 formed in the pin mounting bodies 38. The slits 69 allow the bifurcated outer ends of the pins 39 to flex resiliently inwardly upon insertion into the sockets 31 to better grip the surfaces of the bores 49 of the sockets. The power and charger cables 16 and 23 are connected to the pins 39 as by screws received in the bores 68 cooperating with screw lugs 71 on the conductors of the cables.

The pins 39 are interconnected to form the power plug 5 and the charger plug 8 by conductive jumper links 72 which are flat and elongated in shape and have screw passing apertures 73 formed through the ends thereof. The jumpers 72 are positioned to extend between selected ones of the pins 39 prior to securing the screw lugs 71 to the pins 39.

The pins 39 are positioned in the mounting bodies 38 in the same pattern as the sockets 31 are positioned in the receptacle body 30. Alternatively, other patterns could be employed for the sockets 31 of the receptable 2 and the pins 39 of the plug assemblies 37 such as non-regular patterns. If such non-regular patterns were used, it would not be necessary to provide the key ridge 35 and key slots 40 to properly orient the plugs in the receptacles. However, the key formations 35 and 40 are preferred because they prevent insertion of a plug into the receptacle and rotating it for proper orientation which might result in short-circuiting the batteries under some circumstances. In addition, while particular embodiments of the sockets 31, pins 39 and jumper 72 have been described and illustrated, these members could be formed otherwise and still be encompassed by the spirit of the present invention.

Referring to FIG. 11, the power plug 5 has two pairs of pins 39 designated as a power plug ground pin 76, a twelve volt positive pin pair 77 and 78 interconnected by a power plug jumper 79, and a twenty-four volt positive pin 80. The ground pin 76 is connected to the ground conductor 18 of the power cable 16; the twelve volt pin pair 77/78 is connected to the twelve volt conductor 19 of the cable 16; and the twenty-four volt pin 80 is connected to the twenty-four volt conductor 20 of the power cable 16. When the power plug 5 is inserted into the receptacle 2, the sockets 54 and 57 are interconnected by the power jumper 79 through pins 77 and 78 such that the batteries 3 and 4 are connected in a series and provide twelve volts on the pin pair 77/78; pin 76 connects with socket 55 providing a power ground; and pin 80 connects with socket 56 providing twenty-four volts. By this means, twelve and twenty-four volt sources are made available to the controller 6 to power the trolling motor 7.

Referring to FIG. 10, the charger plug 8 has two pairs of pins 39 designated as a positive charger pin pair 83 and 84 interconnected by a positive charger jumper 85 and a negative charger pin pair 86 and 87 interconnected by a negative charger jumper 88. The positive charger cable conductor 25 is connected to the positive pin pair 83/84, and the negative charger cable conductor 24 is connected to the negative pin pair 86/87. When the charger plug 8 is inserted into the receptacle 2, the positive pins 83 and 84 are received respectively in the first and second positive sockets 54 and 56 thereby interconnecting the positive battery terminals 59 and 61; and the negative pins 86 and 87 are received in the first and second negative sockets 55 and 57 thereby interconnecting the negative battery terminals 60 and 62. By this means, the batteries 3 and 4 are connected in parallel to receive the charging current from the charger 9.

The screw lugs 65 on the receptacle 2 and lugs 71 on the plugs 5 and 8 are sized to accomodate heavy gage conductors, preferably No. 6 to No. 2 AWG sized wires. The plugs 5 and 8 and receptacle 2 are adapted for use with multiconductor cables having such heavy gage conductors. The jumper links 72 provide for interconnection of selected plug pins 39 without affecting the size of conductors which can be attached to the pins 39. Thus, the components of the connector system 1 are adapted to provide low resistance paths for current flowing from the batteries 3 and 4 and the trolling motor 7 to maximize the energy stored therein.

In summary, the battery connector system 1 is simple and intuitive to operate. When it is desired to charge the batteries 3 and 4, the charger plug 8 is inserted into the receptacle 2 and the charger 9 is turned on. When the batteries have been charged, the charger 9 is turned off and the charger plug 8 is removed from the receptacle. When it is desired to operate the trolling motor 7, the power plug 5 is inserted in the receptacle 2 and the motor 7 is operated by use of the trolling motor controller 6. The controller 6 or the motor 7 may include a master power switch (not shown) which also has to be operated before power is made available to the motor 7.

It is to be understood that while certain forms of the present invention have been illustrated and described herein, it is not to be limited to the specific forms or arrangement of parts described and shown.

What is claimed and desired to be secured by Letters Patent is as follows:

1. A trolling motor battery power and charging plug structure for reception in a keyed receptacle to connect with two pairs of pin sockets of the receptacle which are arranged in a selected pattern and connected respectively to the terminals of a pair of batteries, said structure comprising:
   (a) a nonconductive plug pin mounting body;
   (b) two pairs of elongated conductive plug pins positioned in said pin mounting body in a selected pattern, each pin having an outer end and an opposite inner end, said outer end being split to form a pair of opposing resilient outer ends;
   (c) key means on said pin mounting body;
   (d) a threaded plug pin bore formed in the inner ends of each of said pins to connect the conductor of a cable to said pin;
   (e) a conductive jumper link extending between a selected pair of said pins and cooperating with the plug pin bores thereof to electrically interconnect said selected pair of said pins; and
   (f) a nonconductive enclosure shell cooperating with said pin mounting body to enclose the cable connection bores and said jumper link and forming a handle for gripping to insert said plug structure into a receptacle.

2. A structure as set forth in claim 1 including:
   (a) said plug structure being a trolling motor battery charger plug; and
   (b) a pair of charger jumper links extending between and interconnecting respective pairs of said pins, one pair of pins being designated a positive pin pair and the other pair of pins being designated a negative pin pair.

3. A structure as set forth in claim 2 including:
   (a) a two conductor charger cable for connection of said pairs of pins to a battery charger;
   (b) one conductor of said charger cable having a positive charger conductor screw lug affixed thereto and being connected to said positive pair of pins by means of the plug pin bore of one of the pins of said positive pair of pins; and
   (c) the other conductor of said charger cable having a negative charger conductor screw lug affixed thereto and being connected to said negative pair of pins by means of the plug pin bore of one of the pins of said negative pair of pins.

4. A structure as set forth in claim 1 including:
   (a) said plug structure being a trolling motor power plug; and
   (b) a trolling motor power jumper link interconnecting a selected pair of said pins designated as a single battery voltage positive power pin pair, the remaining pins being designated a negative power pin and a double battery voltage positive power pin.

5. A structure as set forth in claim 4 including:
   (a) a three conductor trolling motor power cable for operative connection of the pins of said power plug to a trolling motor;
   (b) a first conductor of said power cable having a negative power conductor screw lug affixed thereon and being connected to said negative power pin by means of the threaded plug pin bore thereof;
   (c) a second conductor of said power cable having a single voltage positive conductor screw lug affixed thereon and being connected to said single voltage positive power pin pair by means of the threaded plug pin bore of one of the pins said positive pin pair; and
   (d) a third conductor of said power cable having a double voltage positive conductor screw lug affixed thereon and being connected to said double voltage positive power pin by means of the threaded plug pin bore thereof.

6. A structure as set forth in claim 1 including:
   (a) a strain relief clamp attached to said enclosure shell in clamping relation to a cable having the conductors thereof connected to said plug pins.

7. A trolling motor battery connector system for use with a pair of rechargeable batteries to power a trolling motor and to recharge the batteries, said system comprising:
   (a) four pairs of elongated conductive plug pins, each pin having an outer end and an opposite inner end, said outer end being split to form a pair of opposing resilient outer ends, and a threaded plug pin bore being formed in the inner end of each of said pins to connect a conductor of a cable to said pin;
   (b) a pair of trolling motor plugs, each plug including:
       (1) a nonconductive plug pin mounting body;
       (2) plug key means formed on said pin mounting body;
       (3) two pairs of said plug pins mounted in said pin mounting body in a selected pattern;
       (4) at least one conductive jumper link extending between a selected pair of said plug pins and cooperating with the plug pin bores thereof to electrically interconnect said selected pair of pins; and
       (5) a nonconductive plug enclosure shell cooperating with said pin mounting body to enclose the cable connection bores and said jumper link and forming a handle for gripping to insert said plug into a receptacle;
   (c) one of said plugs being a trolling motor charger plug and including a pair of charger plug jumper links extending between selected pairs of the charger plug pins, one of said pairs of charger plug pins being designated a positive charger pin pair and the other pair being designated a negative charger pin pair;
   (d) a two conductor charger cable having a positive charger conductor connected to said positive charger pin pair and a negative charger conductor connected to said negative charger pin pair for connection of said charger plug to a battery charger;
   (e) the other of said plugs being a trolling motor power plug and including a power plug jumper link extending between a selected pair of the power plug pins designated a single battery voltage positive power pin pair, the remaining power plug pins being designated a negative power pin and a double battery voltage positive power pin;

(f) a three conductor power cable having a negative power conductor connected to said negative power pin, a single voltage power conductor connected to said single voltage power pin pair, and a double voltage power conductor connected to said double voltage power pin for operative connection of said power plug to a trolling motor; and (g) a trolling motor receptacle including:
  (1) a nonconductive socket mounting body including a plug pin mounting body receiving recess;
  (2) two pairs of rigid, unitary, conductive pin receiving sockets positioned in said socket mounting body in said selected pattern and within said recess; each socket having an outer end and an opposite inner end; the socket inner end having a plug pin bore to receive a respective one of said plug pins upon the insertion of one of said plugs into said receptacle with the opposing outer ends of said respective pin resiliently compressed within said socket pin bore;
  (3) receptacle key means positioned within said recess which cooperates with said key means of said plugs upon the insertion of one of said plugs into said receptacle; and
  (4) a threaded socket connection bore formed in the inner end of each of said sockets for the connection of a pair of batteries across selected pairs of sockets.

* * * * *